(12) United States Patent
Kim

(10) Patent No.: US 8,655,330 B2
(45) Date of Patent: Feb. 18, 2014

(54) MOBILE COMMUNICATION TERMINAL AND METHOD OF STORING IMAGE THEREOF

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1169 days.

(21) Appl. No.: 11/952,835

(22) Filed: Dec. 7, 2007

(65) Prior Publication Data

US 2008/0176599 A1 Jul. 24, 2008

(30) Foreign Application Priority Data

Jan. 19, 2007 (KR) .................. 10-2007-0006323

(51) Int. Cl.
*H04M 3/42* (2006.01)

(52) U.S. Cl.
USPC ...... 455/415; 455/556.1; 455/567; 455/414.1

(58) Field of Classification Search
USPC ............... 455/41–413, 415, 466, 556.1–567
See application file for complete search history.

(56) References Cited

U.S. PATENT DOCUMENTS

| | | | |
|---|---|---|---|
| 5,612,993 A * | 3/1997 | Hanaoka et al. | 379/100.03 |
| 2002/0094806 A1* | 7/2002 | Kamimura | 455/415 |
| 2003/0100295 A1* | 5/2003 | Sakai et al. | 455/415 |
| 2004/0023685 A1* | 2/2004 | Nakamura | 455/550.1 |
| 2004/0142708 A1* | 7/2004 | Asada et al. | 455/466 |
| 2005/0192050 A1* | 9/2005 | Son et al. | 455/556.1 |
| 2005/0289483 A1* | 12/2005 | Kwon et al. | 715/864 |
| 2006/0055607 A1* | 3/2006 | Satoh et al. | 343/702 |
| 2006/0148529 A1* | 7/2006 | Yoon et al. | 455/566 |
| 2006/0248098 A1 | 11/2006 | Kim | |
| 2007/0036128 A1* | 2/2007 | Mori | 370/352 |
| 2007/0081643 A1* | 4/2007 | Divine | 379/100.01 |
| 2007/0120952 A1* | 5/2007 | Kim | 348/14.01 |
| 2007/0296739 A1* | 12/2007 | Lonn | 345/634 |
| 2008/0084970 A1* | 4/2008 | Harper | 379/79 |
| 2010/0215217 A1* | 8/2010 | Currivan et al. | 382/103 |

FOREIGN PATENT DOCUMENTS

| | | |
|---|---|---|
| JP | 2000-92185 A | 3/2000 |
| KR | 10-2005-0028930 A | 3/2005 |
| KR | 10-0606742 B1 | 8/2006 |

* cited by examiner

*Primary Examiner* — Dai A Phuong
(74) *Attorney, Agent, or Firm* — Birch, Stewart, Kolasch & Birch, LLP

(57) ABSTRACT

A method of operating a mobile communication terminal, the method including photographing an image and interconnecting the photographed image with an input number such that when the number is input into the mobile communication terminal, the photographed image is automatically displayed on the mobile communication terminal.

10 Claims, 7 Drawing Sheets

| 1 | My sweetheart | C:/cameraalbum/kimtaehee folder |
| 2 | Daddy | D:/cameraalbum/daddypicture folder |
| 3 | Mommy | E:/cameraalbum/mommyfolder |
| ... | ... | ... |
| n | ... | ... |

FIG. 4

| 1 | My sweetheart | C:/cameraalbum/kimtaehee folder |
| 2 | Daddy | D:/cameraalbum/daddypicture folder |
| 3 | Mommy | E:/cameraalbum/mommyfolder |
| ... | ... | ... |
| n | ... | ... |

MOBILE COMMUNICATION TERMINAL AND METHOD OF STORING IMAGE THEREOF

This application claims priority to Korean Patent Application No. 10-2007-0006323, filed in Korea on Jan. 19, 2007, which is hereby incorporated by reference as if fully set forth herein.

BACKGROUND OF THE INVENTION

1. Field of the Invention

The present invention relates to a mobile communication terminal, and corresponding method for interconnecting photographed images with an abbreviated number.

2. Discussion of the Related Art

Mobile communication terminals now provide many additional functions besides the basic call function. For example, users can now access the Internet, play videos, listen to music, perform scheduling tasks, play games, etc. In addition, with the increase in functions, the amount of menu options provided on the terminal has also increased.

Further, users can now store a variety of content on their terminal. For example, users can store pictures, music files (e.g., MP3 files), word document files, phonebook listings, as well as other types of data. Therefore, it is often cumbersome and time consuming for a user to search through the variety of different content stored on their terminal.

SUMMARY OF THE INVENTION

Accordingly, one object of the present invention is to address the above-noted and other problems.

Another object of the present invention is to provide a mobile communication terminal and corresponding method for efficiently storing images and interconnecting the stores images with an abbreviated number.

To achieve these objects and other advantages and in accordance with the purpose of the invention, as embodied and broadly described herein, the present invention provides in one aspect, a method of operating a mobile communication terminal. The method includes photographing an image, and interconnecting the photographed image with an input number such that when the number is input into the mobile communication terminal, the photographed image is automatically displayed on the mobile communication terminal.

In another aspect, the present invention provides a mobile communication terminal including a wireless communication unit configured to wirelessly communicate with at least one other terminal, a camera unit configured to photograph an image, and a control unit configured to interconnect the photographed image with an input number such that when the number is input into the mobile communication terminal, the photographed image is automatically displayed on the mobile communication terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a status diagram for images stored by the image storing method shown in FIG. 2 or FIG. 3;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The mobile communication terminal described in the present specification includes any portable electronic device. For instance, the mobile terminal may be a mobile phone, a digital broadcast terminal, an MP3 player, a PDA (personal digital assistant), a PMP (portable multimedia player) or the like.

Figure 1:
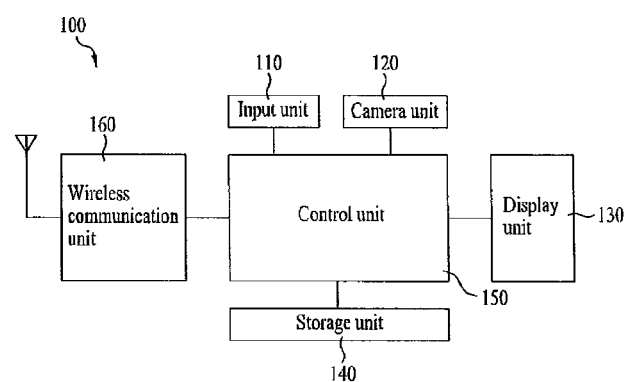
FIG. 1 is a block diagram of a mobile communication terminal according to one embodiment of the present invention.

FIG. 1 is a block diagram of a mobile communication terminal 100 according to one embodiment of the present invention. As shown, the mobile communication terminal 100 includes an input unit 110, a camera unit 120, a display unit 130, a storage unit 140, a control unit 150, and a wireless communication unit 160.

The control unit 150 controls the overall operation of the mobile terminal 100. The storage unit 140 stores a variety of contents (data) such as music files, pictures, phonebook listings, word documents, information input by a user, and other data used in operating the mobile terminal 100.

The input unit 110 includes a plurality of keys or buttons that the user may select to input information into the terminal 100. The input unit 110 may also include a touch screen or touch pad that the user can touch to enter a particular command or to input information into the terminal 100. When the input unit 110 includes such a touch screen or touch pad, the touch screen or touch pad can be combined with the display unit 130 such that the input unit 110 can be minimized or eliminated.

In addition, the display unit 130 displays a variety of information to the user such as a status of the terminal 100, images stored in the terminal 100, movies or other broadcasts, etc. The display unit 130 also displays a plurality of menu options that the user can select to perform different functions on the terminal 100.

The wireless communication unit 160 wirelessly communicates with other mobile terminals via a communication network. The wireless communication unit 160 is also used to connect the terminal 100 to the Internet. Further, the camera unit 120 is used to capture still and moving pictures. The control unit 150 controls the above-described units to perform the overall operations of the terminal 100.

A method of storing an image in a mobile communication terminal according to one embodiment of the present invention will now be explained with reference to FIG. 2. FIG. 1 will also be referred to in this description.

Figure 2:
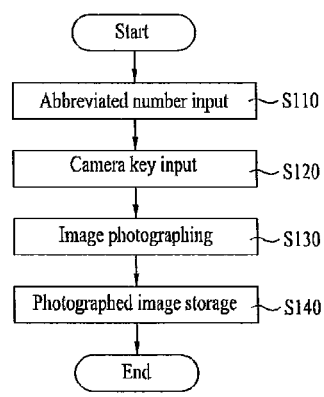
FIG. 2 and FIG. 3 are flowcharts of a method of storing an image in a mobile communication terminal according to one embodiment of the present invention.

As shown in FIG. 2, the user uses the input unit 110 to input a first abbreviated number (S110). The user then operates the camera unit 120 by selecting a camera key to capture an image (S120 and S130). The user then selects a store key to command the control unit 150 to store the captured image in the storage unit 140 (S140).

Further, the captured and stored image is interconnected or linked with the first abbreviated number such that when the user enters the first abbreviated number in a prescribed manner (e.g., for a particular period of time or followed by another command key such as the "#" sign key) on the mobile terminal 100, the control unit 150 automatically displays the captured image on the display unit 130. That is, the entered first abbreviated number functions as a hot key to automatically display the image linked with the first number. Further, the image can be a still picture or a moving picture.

Figure 6:
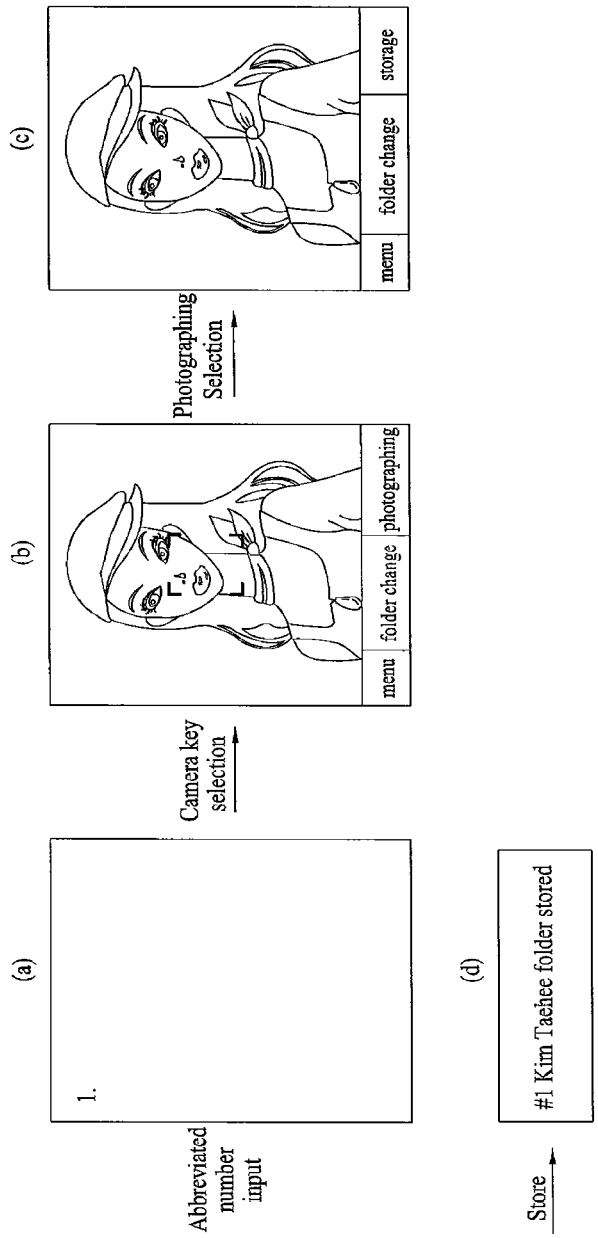
FIG. 6 is a status diagram for storing an image by the image storing method shown in FIG. 2.

FIGS. 6(a)-6(d) illustrate screen shots of a mobile terminal performing the steps shown in FIG. 2. In more detail, the user has entered the first abbreviated number (e.g., 1 shown in the upper left hand corner of FIG. 6(a)), and then executes a camera function provided with the terminal as shown in FIG. 6(b). As shown in FIG. 6(b), the user can view and adjust the angle or zoom feature related to taking the picture. The user then captures the image as shown in FIG. 6(c). FIG. 6(d) illustrates the captured pictured being stored in the storage unit 140.

Further, the stored image can also be linked or interconnect with a particular operation on the terminal such as calling function, message editing function, etc. Thus, when the user receives or makes a call to someone identified in their phonebook listing, the stored image can be displayed when the call function is performed. The same is true with respect to an incoming call, a message sending operation, message receiving operation, etc.

In more detail, the first abbreviated number (e.g., '1') is linked to the stored image and to a phone number for 'Kim Taehee', (as an example). Thus, when the user makes or receives a call to/from Kim Taehee, the corresponding stored image is displayed. Further, the first abbreviated number may be linked to an individual still or movie picture, or may be linked to the folder including images. That is, the user can have a folder titled 'Kim Taehee' and have the folder linked with the telephone number for 'Kim Taehee' such that contents included in the folder 'Kim Taehee' are displayed when a particular function on the terminal is performed (e.g., a calling or messaging function).

FIG. 4 illustrates interconnecting the first abbreviated number to an item of a phonebook or a folder. As shown in FIG. 4, the abbreviated number 1 is interconnected to the phonebook listing 'my sweetheart' and to the folder or directory 'C:/cameraalbum/kimtaehee folder'. In this instance, when the user enters the first abbreviated number into the terminal in a prescribed manner, the contents in the 'C:/cameraalbum/kimtaehee' would be executed. That is, the control unit 150 sequentially executes contents having a same type (e.g., images), randomly executes contents having a same type, executes a user-selected default content in the folder, etc.

FIG. 4 also illustrates the abbreviated number 2 being interconnected to the phonebook listing 'daddy' and to the directory or folder 'C:/cameraalbum/daddypicture'. A similar concept applies to the abbreviated number 3 linked to the phonebook listing "Mommy" and the directory or folder 'E:/cameraablbum/mommyfolder'.

Next, a method of storing an image in a mobile communication terminal according to another embodiment of the present invention will be described with respect to FIG. 3. FIG. 1 will also be referred to in this description.

Figure 3:
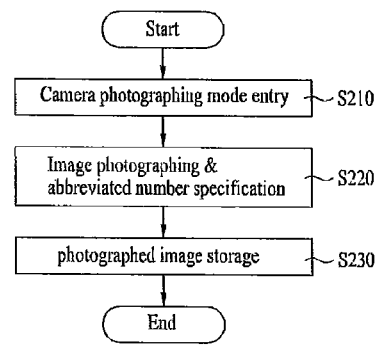

As shown in FIG. 3, the user enters into the camera photographing mode (S210), and the control unit 150 places the terminal into a preview mode meaning that an object to be taken can be previewed. The user can then capture the image. After the image has been captured, the control unit 150 prompts the user to select a folder or storage area where the user wants to store the captured image (S230). When the user selects the particular folder or storage area, the control unit stores the captured image in the storage unit 140 under the corresponding folder name (S23).

Figure 5:
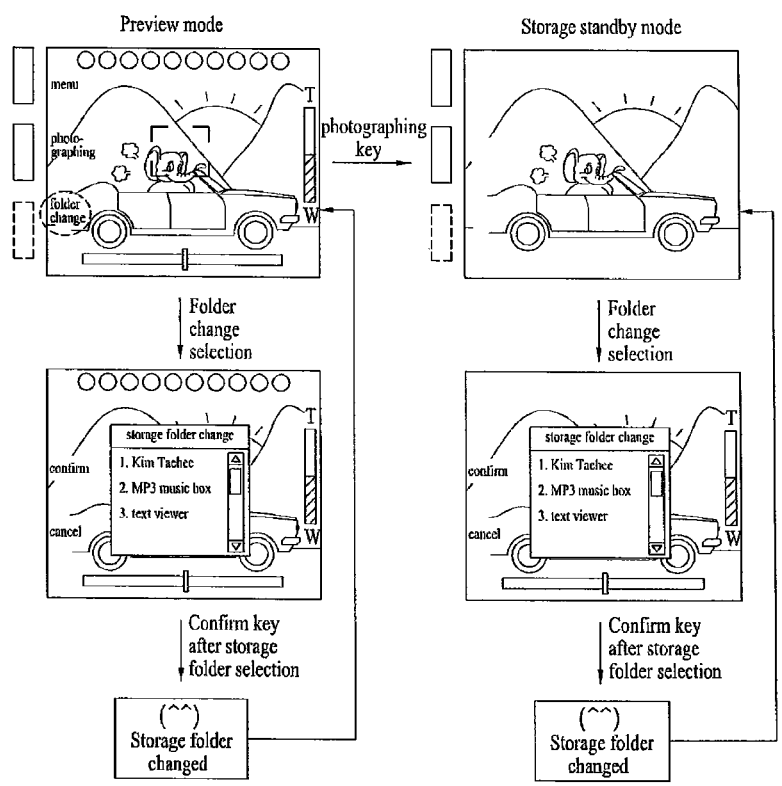
FIG. 5 is a status diagram for a changing storage folder changing by the image storing method shown in FIG. 2 or FIG. 3.

Further, the folder name or storage area is also linked to an abbreviated number as described above. Also, the linking of the image with the folder or storage area may be performed in the preview mode or after the image has been captured. For example. FIG. 5 illustrates the prompting of the user to select or change a folder for storing the image during both the preview mode (the left side of FIG. 5) and after the image has been captured (the right side of FIG. 5). Thus, in FIG. 5, the user can set or change where the image is stored.

Figure 7:
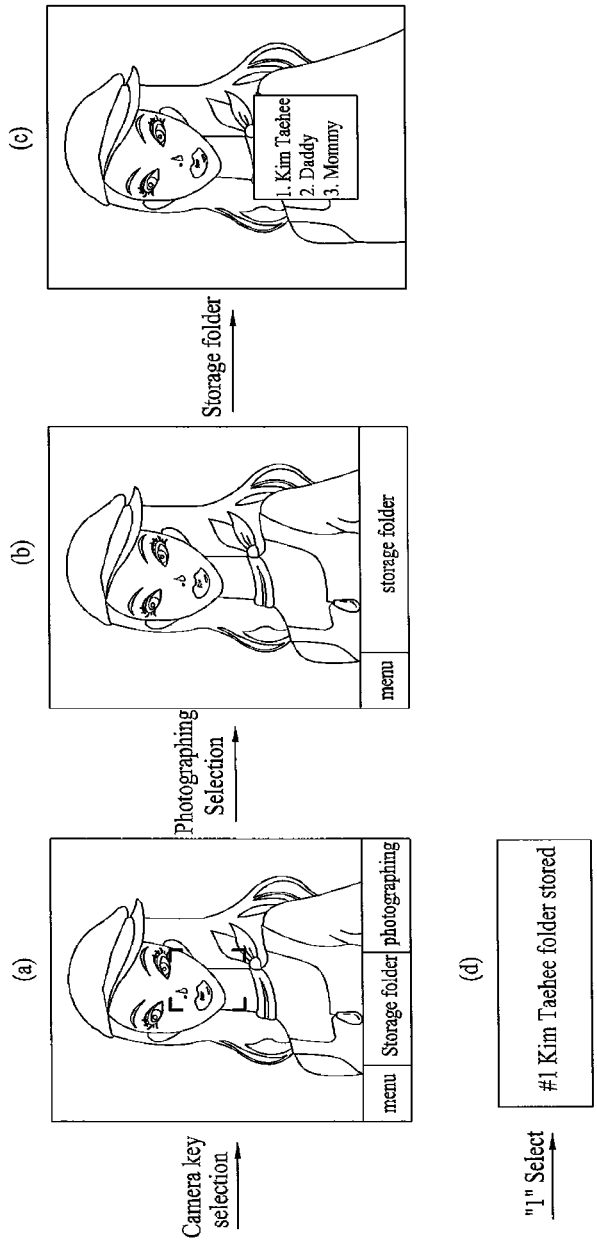
FIG. 7 is a status diagram for storing an image by the image storing method shown in FIG. 3.

Next, FIGS. 7(a)-7(d) illustrates screens shots of the terminal when performing the method shown in FIG. 3. As shown in FIG. 7(a), the user first enters the camera mode so he or she can capture an image. That is, the user enters the preview camera mode so he or she can view the image to be captured.

FIG. 7(b) illustrates the user capturing the image, and FIG. 7(c) illustrates the control unit 150 prompting the user to select a folder name used to store the capture image. Note that the folder name is also linked to the abbreviated number such that when the user enters the abbreviated number on the terminal in a prescribed manner, the content or contents stored in the corresponding folder are executed. FIG. 7(d) illustrates the control unit 150 displaying to the user the captured image has been successfully stored.

Further, in another embodiment of the present invention, an image stored in the storage area that is interconnected to the abbreviated number can be removed or copied and to another storage area (e.g., a daddy picture folder interconnected to a second abbreviated number). In addition the control unit 150 can control the wireless communication until 160 to transmit an image stored in a storage area that is interconnected to an abbreviated number (e.g., 'Kim Taehee' folder interconnected to an abbreviated number 1) to a phone number corresponding to the abbreviated number. The transfer, copy or transmission of the stored image can be using the appropriate keys on the input unit 110 when viewing the stored image, for example.

Further, as discussed above, the stored image and interconnected abbreviated number can be linked or interconnected to any phone number included in a user's phone book list. For instance, the abbreviated number 1 can be interconnected to the 'Kim Taehee' folder, and simultaneously, to a phone number corresponding to a name of 'Kim Taehee' included in the phonebook list.

Then, when the communication unit 160 receives a wireless signal from a phone number corresponding to 'Kim Taehee', the stored image or images existing within the 'Kim Taehee' folder can be displayed on the display unit 130. In addition, when the folder includes a plurality of contents, the control unit 150 can display a default image, sequentially display the stored images, randomly display the stored images, etc. A similar concept applies to the situation when the user places an outgoing call.

Further, a message writing or reading function may also be interconnected with the abbreviated number and stored image. For example, when the user is writing or sending a message to a phone number for 'Kim Taehee' corresponding to the abbreviated number 1, an image existing within the 'Kim Taehee' folder can be displayed as a background image. Further, the displayed image can be a still picture.

Thus, because the image or images are linked to an abbreviated number and particular function on the terminal such as a calling or message function, the user sees the image they set for that particular function. This makes operating the mobile terminal more fun for the user.

Accordingly, the present invention provides several advantages. First, the present invention advantageously interconnects a captured image with an abbreviated number, such that when the user input the abbreviated number in a prescribed manner, the image is displayed. Secondly, the present invention allows the user to efficiently manage stored images. Thirdly, the present invention advantageously allows the user to interconnect the abbreviated number and the stored image with a particular function on the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of operating a mobile communication terminal, the method comprising:
    receiving an input corresponding to an abbreviated number, the abbreviated number being interconnected with a first folder among a plurality of folders;
    photographing an image after the input of the abbreviated number;
    storing the image into the first folder;
    initiating a communication with a third party corresponding to the abbreviated number; and
    automatically displaying at least one image stored in the first folder on the mobile communication terminal,
    wherein the abbreviated number is further interconnected with contact information of the third party, wherein photographing the image comprises photographing a plurality of images, and
    wherein the method further comprises:
    storing the plurality of images in the first folder interconnected to the abbreviated number input to the mobile communication terminal; and
    displaying one of a default image of the plurality of images, the plurality of images in a sequential manner, and the plurality of images in a random manner, when the abbreviated number is input into the mobile communication terminal.

2. The method of claim 1, wherein photographing the image comprises entering into a photographing preview mode such that the image to be captured can be previewed, and
    wherein the method further comprises:
    displaying the plurality of folders where the photographed image can be stored; and
    storing the image in a second folder from the plurality of folders after the image is photographed, if the second folder is selected from the displayed folders.

3. The method of claim 1, further comprising:
    displaying the plurality of folders where the photographed image can be stored after the image is photographed; and
    storing the image in a second folder from the plurality of folders after the image is photographed, if the second folder is selected from the displayed folders.

4. The method of claim 1, further comprising:
    copying, transmitting or moving the photographed image from the first folder to a second folder.

5. The method of claim 1, wherein if an input corresponding to a second abbreviated number interconnected with a second folder among the plurality of folders is received, the photographed image is stored in the second folder.

6. A mobile communication terminal, comprising:
    a wireless communication unit configured to wirelessly communicate with at least one other terminal;
    an input unit configured to receive user input;
    a camera unit configured to photograph an image;
    a display unit;
    a storage unit comprising a plurality of folders; and
    a control unit configured to store the photographed image into a first folder among the plurality of folders after an input corresponding to an abbreviated number interconnected with the first folder is received via the input unit, and automatically display at least one image stored in the first folder including the photographed image on the display unit when a communication with a third party corresponding to the abbreviated number is initiated,
    wherein the abbreviated number is further interconnected with contact information of the third party,
    wherein the control unit is further configured to photograph a plurality of images, wherein the storage unit is further configured to store the plurality of images in the first folder interconnected to the abbreviated number, and
    wherein the display unit is further configured to display one of a default image of the plurality of images, the plurality of images in a sequential manner, and the plurality of images in a random manner, when the abbreviated number is input into the mobile communication terminal.

7. The mobile communication terminal of claim 6, wherein the control unit is further configured to enter the mobile communication terminal into a photographing mode after the abbreviated number is input to the mobile communication terminal.

8. The mobile communication terminal of claim 6, wherein the control unit is further configured to enter the mobile communication terminal into a photographing preview mode such that the image to be captured can be previewed,
    wherein the display unit is further configured to display the plurality of folders where the photographed image can be stored, and
    wherein the storage unit is further configured to store the image in a second folder from the plurality of folders, if the image is selected from the displayed folders.

9. The mobile communication terminal of claim 6, wherein the display unit is further configured to display the plurality of folders where the photographed image can be stored after the image is photographed, and
    wherein the storage unit is further configured to store the image in a second folder from the plurality of folders after the image is photographed, if the second folder is selected from the displayed folders.

10. The mobile communication terminal of claim 6, wherein if an input corresponding to a second abbreviated number interconnected with a second folder among the plurality of folders is received, the photographed image is stored in the second folder.

* * * * *